United States Patent [19]
Kost et al.

[11] Patent Number: 5,727,856
[45] Date of Patent: Mar. 17, 1998

[54] SLIP CONTROLLER FOR A DRIVE SLIP CONTROL SYSTEM

[75] Inventors: Friedrich Kost, Kornwestheim; Guenter Barth, Korntal-Muenchingen; Rolf Maier-Landgrebe, Kernen, all of Germany

[73] Assignee: Robert Bosch GmbH, Stuttgart, Germany

[21] Appl. No.: 735,711

[22] Filed: Oct. 23, 1996

[30] Foreign Application Priority Data

Nov. 14, 1995 [DE] Germany ............ 195 42 294.5

[51] Int. Cl.$^6$ .................. B60T 8/32; B60K 28/16
[52] U.S. Cl. ............ 303/195; 303/141; 303/191; 303/169; 180/197
[58] Field of Search .................. 303/141, 195, 303/196, 194, 191, 169; 180/197; 364/426.01, 426.015, 426.016, 426.019, 426.027, 426.028, 426.029

[56] References Cited

U.S. PATENT DOCUMENTS

| | | | |
|---|---|---|---|
| 5,443,307 | 8/1995 | Maier | 303/169 |
| 5,445,442 | 8/1995 | Barth et al. | 303/141 |
| 5,556,174 | 9/1996 | Wiss et al. | 303/191 |

OTHER PUBLICATIONS van Zanten et al "VDC, The Vehicle Dynamics Control System of Bosch" Advancements in ABS/TCS and Brake Technology (SP-1075) Mar. 2, 1995.

*Primary Examiner*—Douglas C. Butler
*Attorney, Agent, or Firm*—Felfe & Lynch

[57] ABSTRACT

At least one controlled variable depending on the rotational speed of the wheels and at least one desired value are sent to a controller. The controller exhibits low-pass behavior, this low-pass behavior being variable depending on whether or not certain operating conditions are present. The invention offers the advantage that excitations of drive train vibrations are effectively suppressed.

5 Claims, 2 Drawing Sheets

SLIP CONTROLLER FOR A DRIVE SLIP CONTROL SYSTEM

BACKGROUND OF THE INVENTION

The invention relates to a slip controller which utilizes at least one controlled value which depends on the rotational speeds of the wheels and at least one desired value.

U.S. Pat. No. 5,445,442 discloses a drive slip control system in which the drive slip controller is divided into a differential speed controller which generates a braking torque value using the difference between the actual speeds and the desired speeds of the driven wheels, and a cardan controller which processes the engine speed in order to damp the fluctuations between engine speed and wheel speeds which result from the elasticity of the drive train.

U.S. Pat. No. 5,443,307 discloses a drive slip control system in which the goal is to improve the controller properties by means of a differential speed controller, so that the differential locking action is improved upon the actuation of the brakes.

In the technical paper "VDC, The Vehicle Dynamics Control System of Bosch" in Advancements in ABS/TCS and Brake Technology (SP-1075), a cascaded drive slip controller is disclosed as part of system for controlling the vehicle dynamics. Here, the presence of different operating conditions of the vehicle is detected and used to help control the drive slip.

SUMMARY OF THE INVENTION

The object of the present invention is to improve the behavior of a drive slip control system under certain operating conditions of the vehicle, these conditions pertaining in particular to the startup process.

The invention is based on a system for controlling the drive slip of a motor vehicle, in which at least one controlled value depending on the rotational velocity of the wheels and at least one desired value are sent to a controller. The invention is to be seen against the background that torsional elasticities in the drive train of the vehicle can cause vibrations in the drive train. These drive train vibrations, especially under certain operating conditions, can also be excited by the control of drive slip.

The core of the invention consists in that the controller exhibits low-pass behavior. This low-pass behavior is variable as a function of the presence of certain operating conditions. The invention offers the advantage that the excitations of the drive train vibrations described above are effectively suppressed.

The low-pass behavior of the controller can be characterized by various time constants.

To determine the operating conditions under which drive train vibrations tend to occur, the system can evaluate the drive slip of the driven wheels. Alternatively or in addition to the use of drive slip to determine the operating conditions, the system can also evaluate the longitudinal velocity of the vehicle.

The drive slip and the longitudinal velocity of the vehicle can be evaluated by comparing the drive slip of the driven wheels with at least one first threshold and by comparing the longitudinal velocity of the vehicle with a second threshold.

The tendency for drive train vibrations to occur is especially pronounced when the drive slip of the two drive wheels is in the unstable, i.e., falling, region of the slip curve known in and of itself. In this case, the controller must have show strong low-pass filtering behavior; that is, it must have a large time constant.

Weak low-pass filtering behavior (or none at all) is advantageous when the drive slip of at least one drive wheel is below a slip threshold or when the longitudinal velocity of the vehicle is low, because the phase displacement caused by the filtering has an especially disadvantageous effect on the control behavior in the startup range of the vehicle. For this reason, it is advantageous for a first operating condition to be defined as that which is present when the drive slip of the driven wheels is below a first threshold or when the longitudinal velocity of the vehicle is below a second threshold. In the presence of this first operating condition, the low-pass behavior of the controller is characterized by a first time constant, whereas, in the presence of an operating condition which does not correspond to the first operating condition, this time constant is increased.

In the case of a vehicle with one drive axle, therefore, relatively weak low-pass filtering with a time constant of, for example, 20–40 ms occurs in the controller when the following condition is fulfilled, where "OR" is to be understood as the "or" of a logical relationship (i.e., "inclusive or"):

drive slip/right is below threshold 1;

OR drive slip/left is below threshold 2;

OR vehicle velocity is below threshold 3.

If the condition given above is not satisfied, a relatively strong low-pass filtering with a time constant of, for example, 60–80 ms is carried out in the controller.

A first-order time-delay device known in and of itself can be used as the low-pass filter.

The invention is advantageously embedded in a drive slip control system, which calculates a first controlled variable dependent on the average rotational speed of the driven wheels and a second controlled variable dependent on the difference between the rotational speeds of the driven wheels. It can be provided that, for the control of the drive slip, the first and second controlled variables are compared with a first and a second desired value. The first and second desired values are determined as a function of a predetermined desired value for the average absolute slip and as a function of a predetermined desired value for a locking moment.

DETAILED DESCRIPTION OF THE PREFERRED EMBODIMENT

The core of the invention, which is to be found in the influence exerted on the low-pass behavior of the slip controller, is described as embedded in a complete system.

This complete system serves to control the drive slip in motor vehicles with conventional drive. The desired drive slip values for the two drive wheels can originate either from a preceding open-loop control system from a cascaded automatic vehicle dynamics controller. In the complete system, desired braking moments for the two drive wheels and the desired engine torque are then calculated. The desired braking moments can be converted in a following open-loop control unit into brake pressure control signals for the brake hydraulic system. A following open-loop control unit can generate a throttle valve control signal, for example, from the desired engine torque.

As already mentioned, the division of the drive slip controller into a cardan controller and a differential speed controller is known from U.S. Pat. No. 5,445,442. In the present exemplary embodiment, the two controllers are designed to be largely independent of the actuators which are available. The division into the two controller values, i.e., into the desired cardan moment $M_{Kar}$ and the desired differential moment $M_{Dif}$, is carried out in the following actuator-specific module. This makes it easier to supplement the action taken on the throttle valve with additional (fast) methods of acting on the engine such as adjusting the ignition angle or masking the fuel injection.

Figure 1:
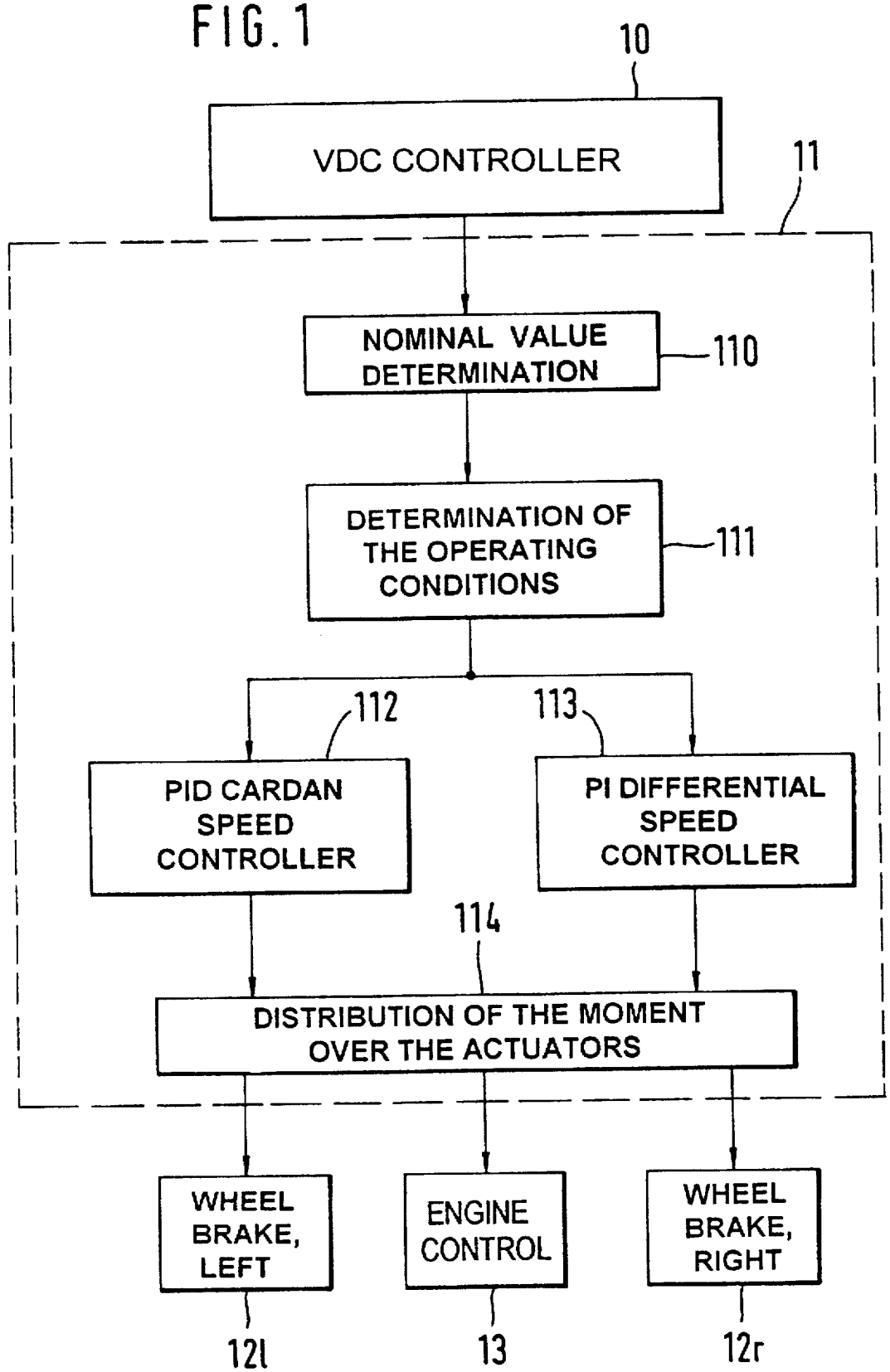
FIG. 1 is a block circuit diagram showing the control structure according to the invention.

FIG. 1 shows a cascaded vehicle dynamics controller (VDC controller), indicated by reference number 10. This VDC controller determines in particular the desired values $\lambda_{So/l}$ and $\lambda_{So/r}$ for the drive slip of the left and right driven wheel wheels in accordance with a cascaded control system. Reference is made to the ATZ article cited above for a description of a VDC controller of this type.

In addition to the desired values $\lambda_{So/l}$ and $\lambda_{So/r}$ for the drive slip of the left and right driven wheels of the vehicle, the VDC controller also determines the free-rolling (slip-free) wheel speeds $v_{Radfrei/l}$ and $v_{Radfrei/r}$, and the rotational speeds $v_{Rad/l}$, $v_{Rad/r}$ of the driven wheels. To determine the free-rolling (slip-free) wheel speeds, reference is made again to the VDC article cited above and also to DE Application 42 30 295.

The desired values $\lambda_{So/l}$ and $\lambda_{So/r}$ for the drive slip of the left and right driven wheels, the free-rolling (slip-free) wheel speeds $v_{Radfrei/l}$ and $v_{Radfrei/r}$ and the rotational speeds $v_{Rad/l}$, $v_{Rad/r}$ of the driven wheels are transmitted to drive slip controller 11. Drive slip controller 11 then generates, in a manner to be described later, the signals $M_{RadSo/l}$ and $M_{RadSo/r}$, which correspond to the desired braking moments at the right and left driven wheels. These desired braking moments are transmitted to blocks 12l, 12r, by means of which these braking moments are produced at the wheel brakes, possibly by a cascaded automatic control circuit. In addition, controller 11 also determines a desired value $M_{SoMot}$ for the engine torque, which is sent to a cascaded open-loop engine control system 13.

The details of drive slip controller 11 are described below.

In desired value determination step 110, the cardan rotational speed $v_{Kar}$, as the mean value of the wheel rotational speeds $v_{Rad/l}$ and $v_{Rad/r}$ and the differential rotational speed $V_{Dif}$, as the difference between the wheel rotational speeds $v_{Rad/l}$ and $v_{Rad/r}$ are calculated from the wheel rotational speeds $v_{Rad/l}$ and $v_{Rad/r}$ of the left and right drive wheels, the free-rolling rotational speeds $v_{Radfrei/l}$ and $v_{Radfrei/r}$ and the desired drive slip $\lambda_{So/l}$ and $\lambda_{So/r}$ for the drive wheels:

Actual rotational speeds:

$$v_{Kar} = (v_{Rad/l} + v_{Rad/r})/2$$

$$v_{Dif} = v_{Rad/l} - v_{Rad/r}$$

The desired values $v_{SoKar}$ and $v_{SoDif}$ for the cardan and differential speeds can be determined from the desired rotational speeds $v_{SoRad/l}$ and $V_{SoRad/r}$ of the wheels, which are formed as a function of the desired drive slip $\lambda_{So/l}$ and $\lambda_{So/r}$:

$$v_{SoRad/l} = v_{Radfrei/l} * (1+\lambda_{So/l})$$

$$v_{SoRad/r} = v_{Radfrei/r} * (1+\lambda_{So/r})$$

$$v_{SoKar} = (v_{SoRad/l} + v_{SoRad/r})/2$$

$$v_{SoDif} = v_{SoRad/l} - v_{SoRad/r}$$

In block 111, operating states are determined, whereupon, in reaction to certain operating states, predetermined measures are taken. One such measure pertains, according to the invention, to the change in the low-pass behavior of the controller whenever operating states associated with the presence of drive train vibrations or with their possibility are encountered.

As already mentioned, torsional elasticities in the drive train of the vehicle can cause vibrations in the drive train. Such drive train vibrations are generally not present, however, when the following condition is satisfied, where "OR" stands for the "or" of a logical relationship:

drive slip/right is below threshold 1;

OR drive slip/left is below threshold 2;

OR vehicle velocity is below threshold 3.

Otherwise, that is, when the condition given above is not satisfied, drive train vibrations can occur.

In this exemplary embodiment, the cardan rotational speed $v_{Kar}$ and the differential rotational speed $v_{Dif}$ are sent through a low-pass filter in block 111, the time constant τ of this low-pass filter being variable. The filtered cardan rotational speed $v_{Karf}$ and the filtered differential rotational speed $v_{Diff}$ are then sent to cardan speed controller 112 and differential speed controller 113, respectively.

Figure 2:
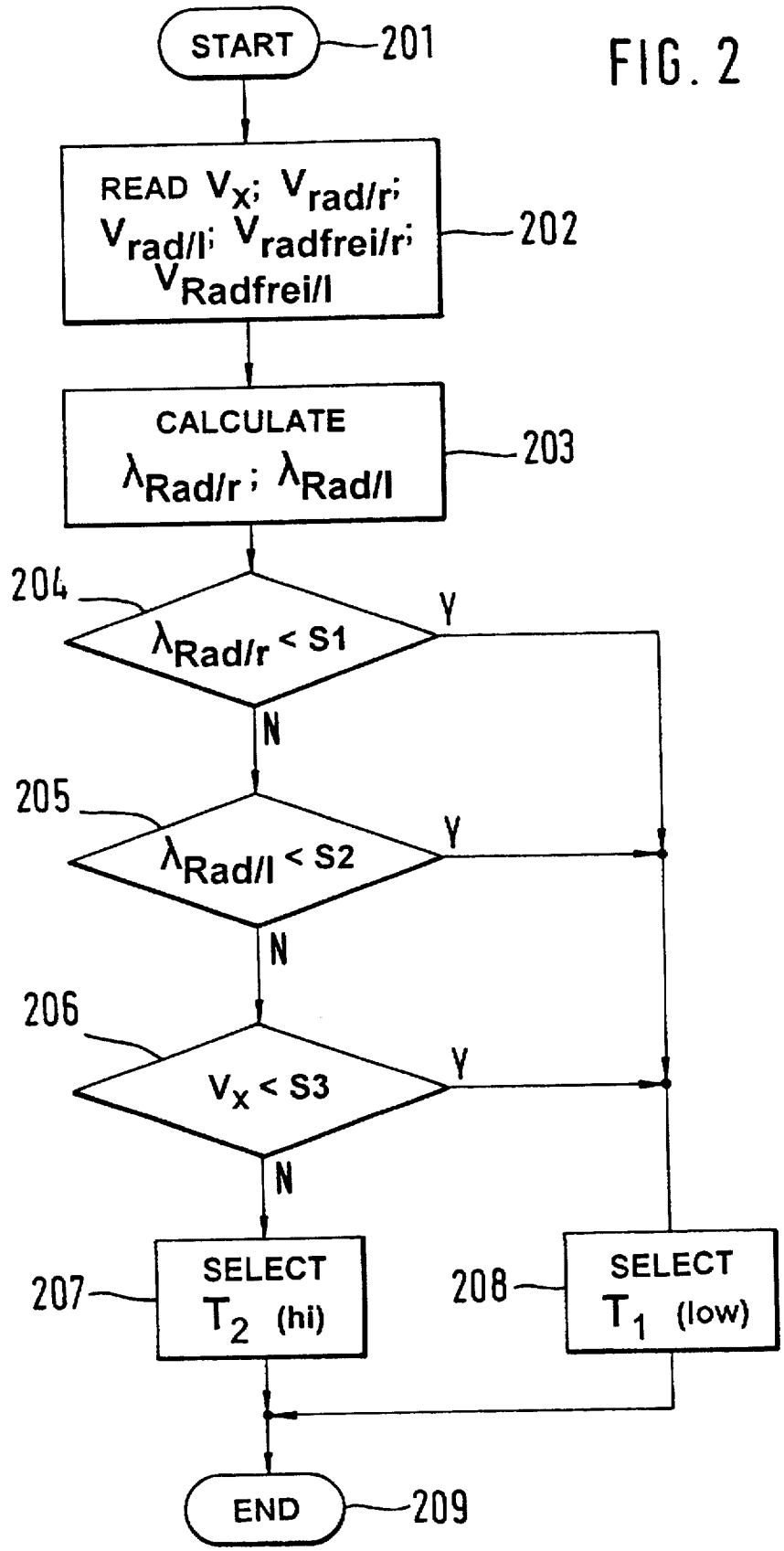
FIG. 2 is a flow diagram of the invention.

To determine the operating state and the change in the low-pass filtering, the sequence of steps illustrated in FIG. 2 is carried out in block 111.

After starting step 201, the vehicle longitudinal velocity $v_x$, the wheel rotational speeds $v_{Rad/l}$ and $v_{Rad/r}$ of the left and right drive wheels, and the free-rolling wheel speeds $v_{Radfrei/l}$ and $v_{Radfrei/r}$ are accepted as input in step 202. In step 203, the current values /Rad/l and /Rad/r for the wheel slip at the left and right drive wheels are determined:

$$\lambda_{Rad/l} = 1 - \frac{v_{Rad/l}}{v_{Radfrei/l}}$$

$$\lambda_{Rad/r} = 1 - \frac{v_{Rad/r}}{v_{Radfrei/r}}$$

In steps 204 and 205, the program asks whether the current values $\lambda_{Rad/l}$ and $\lambda_{Rad/r}$ for the wheel slip at the left and right drive wheels are below thresholds S1 and S2, respectively, where in particular S1=S2 can be provided. In step 206, the system determines whether the vehicle longitudinal velocity $v_x$ is below threshold S3. S3 can be, for example, 2 m/s.

If all the results of questions 204, 205, and 206 are negative, then in step 207 the low-pass filtering mentioned above is carried out with the relatively high time constant $τ_2$; $τ_2$ can be in the range of 60–80 ms, for example. But if one of the questions has been given a positive answer, then in step 208 the low-pass filtering indicated above is carried out with the relatively low time constant $τ_1$; $τ_1$ can be in the range of 20–40 ms, for example. After final step 209, the sequence shown in FIG. 2 begins again from the beginning.

As an alternative to the low-pass filtering of the cardan rotational speed $v_{Kar}$ and the differential rotational speed $v_{Dif}$, it is also possible for the P component of cardan speed controller 112 or of differential speed controller 113 to be designed as a $PT_1$ component. This variant is described below with respect to blocks 112 and 113.

In addition, block 111 can be designed to limit the desired engine torque. The point in question here is that, when it is desired to increase the engine torque $M_{SoMot}$, it should not be possible for the torque to be any higher than the torque $M_{FV}$ specified by the driver. The driver's command $M_{FV}$ therefore serves as a limit on the desired engine torque. When the desired engine torque is in this state of saturation, the flag "lanschlag" is set. The engine torque saturation value $M_{FV}$ is determined with the help of the estimated current engine torque, "lanschlag" being set when:

$$M_{SoMot} > c\_motsat * M_{FV}$$

where $$0 < c\_motsat < 1.$$

The cardan speed controller (block 112) uses the input variables cardan rotational speed $v_{Kar}$ (or the low-pass-filtered cardan rotational speed $v_{Karlf}$) and the cardan desired rotational speed $v_{SoKar}$ to determine the cardan moment $M_{Kar}$. For this purpose, the cardan speed controller is designed as a PID controller with a proportional, an integral and a differential component. These components can be designed as follows:

P-Component

If the above-described low-pass filtering is not carried out in block 111, then it is possible, as mentioned, for this filtering to be accomplished in cardan controller 112 according to the equation:

$$v_{Karlf}(t+1) = v_{Karlf}(t) + C_{fil} * [v_{Kar}(t) - v_{Karlf}(t)]$$

where $C_{fil}$ is a filter constant which depends on the above-cited condition. The P component of the cardan speed controller then corresponds to a $PT_1$ component.

The amplification $K_p$ is selected in particular as a function of the instantaneous effective total transmission ratio $i_{Ges}$ (transmission ratio between the engine and the wheels) to take into account the gear-dependent moment of inertia of the engine with respect to the wheels:

$$K_p = C1 + i^2_{Ges} * C2,$$

where C1 and C2 are constants.
The output of the P component is therefore:

$$k_{np} = K_p * (v_{Karlf} - v_{SoKar}).$$

D-Component

Because of the drive train vibrations, the differentiator is designed in essentially the same way as the one described in U.S. Pat. No. 5,443,307 mentioned above:

$$k_{dif} = [i^2_{Ges} * jmot + 2jrad] * [v_{Kar}(t) - v_{Kar}(t-vT)]/(vT),$$

where vT corresponds approximately to the vibration period of the drive train vibrations; $i_{Ges}$ is the instantaneous effective total transmission ratio; and the variables jmot and jrad represent the inertias of the engine and the wheels. The D component has a dead zone. Its value $\epsilon_{Dif}$ is a function of the total transmission ratio $i_{Ges}$:

$$\epsilon_{dif} = \epsilon_{difa} + i^2_{Ges} * \epsilon_{difb},$$

where $\epsilon_{difa}$ and $\epsilon_{difb}$ are constants. For the output, the dead zone results in:

$$k_{nd} = c_d [\min(0, k_{dif} - \epsilon_{dif}) + \max(0, k_{dif} + \epsilon_{dif})].$$

where $c_d$ is a constant.
I-Component

The integrator amplification is usually:

$$K_I = K_{I/a} + i^2_{Ges} * K_{I/b},$$

where $K_{I/a}$ and $K_{I/b}$ are constants.

The integrator amplification $K_I$ is corrected in three different cases (I, II, and III):

I. High-μ Criterion

Pavement with a high coefficient of friction is detected when all of the five different conditions below are satisfied simultaneously:

1. $\lambda_{Rad/l} < \min(\epsilon\lambda_1, \lambda_{So/l} + \epsilon_{\lambda 2})$;
2. $\lambda_{Rad/r} < \min(\epsilon\lambda_1, \lambda_{So/r} + \epsilon_{\lambda 2})$, where $\epsilon\lambda_1$ and $\epsilon\lambda_2$ are constants.
3. $v_x > \epsilon_{vf}$, where $\epsilon_{vf}$ is a threshold value which can be predetermined.
4. lir is not set; that is, the cascaded VDC controller is not set to intervene.
5. Stability: Both drive wheels must remain in the stable branch of the slip curve for a certain period of time; that is, the curve of the cardan speed $v_{Kar}$ may have only a relatively slight degree of "roughness". For this reason, the following stability criterion must be checked:

$$\frac{\sum_{v=0}^{k} |v_{Kar,t-v} - v_{Kar,t-v-1}| + \alpha_1}{\sum_{v=0}^{k} |v_{ref,t-v} - v_{ref,t-v-1}| + \alpha_1} < \beta_1,$$

where the reference cardan speed $v_{ref}$ can be determined from the rotational speeds of the free-rolling drive wheels.

When each of the five conditions above is fulfilled over the time period $t_{min\ 1}$, then $K_I$ is set to a high value:

$$K_I = K_{Ihigh}.$$

II. An Increase in the Integrator Amplification

Conditions 1 and 2 described above for the high-μ criterion are carried over to this case. An additional condition is:

$$kdif < \alpha_2 \cdot ktm^* + \beta_2,\qquad 3.$$

where:

$$ktm^* = (i^2_{Ges} * jmot + 2jrad) * (v_{SoKar,t} - v_{SoKar,t-1})/T$$

If, during the time $t_{min2}$, each of the above three conditions is fulfilled, then $K_I$ is raised to $K_I'$:

$$K_I' = C_{intfak1} \cdot K_I.$$

III. A Decrease in the Integrator Amplification
If the three conditions:

1. $k_{ni} < C_{nilow}$ ($k_{ni}$ is the instantaneous integrator value) and
2. $v_{Kar} < v_{SoKar}$ and
3. case II above is not present for longer than $t_{min3}$, are fulfilled, then the integrator amplification $K_I$ is decreased to $K_I'$ by:

$$K_I' = K_I / c_{intfak2}.$$

The new integrator value is $$k_{ni,t+1} = k_{ni,t} + K_I * (v_{Kar,t} - v_{SoKar,t}).$$

The integrator value is corrected in the following cases:
I) When $$k_{rom} < \epsilon_{krom}$$

is satisfied, $k_{ni}$ becomes $k_{ni}'$ $$k_{ni}' = k_{ni} + c_{kndif} * [\min(0, x + \epsilon_{kndif}) + \max(0, x - \epsilon_{kndif}).$$

In this way, a dead zone is described, where:

$x=k_{dif}$-ktm*.

II) The integrator value is given a lower limit:

$k_{ni}=\max(k_{ni}, k_{ni,min})$.

III) The integrator is given an upper limit by the reduced driver's command torque $M_{fa,r}$:
When $k_{ni} > M_{fa,r}$ is true, two different cases are distinguished:
When, in addition, $v_{Kar} > v_{SoKar}$ is true, then $k_{ni}=M_{fa,r}-K_I * k\_rom$ otherwise, the old integrator value applies $k_{ni,j}=k_{ni,j-1}$.

The output of the cardan controller consists of the sum of the three controller components:

$M_{Kar}=k_{np}+k_{nd}+k_{ni}$.

The PI differential speed controller (block 113) determines the differential moment $M_{Dif}$. The most essential properties of the differential speed controller are described in the following:

Desired Vale Expansion

If the vehicle dynamics control flag "lir" is set, that is, if the cascaded VDC controller is set to make an VDC intervention, the absolute value of the desired value $v_{SoDif}$ for the differential speed is increased to $v_{SoDif}'$:

ti $v_{SoDif}'=(|v_{SoDif}|+\epsilon_{Dif1}*C) * \text{sign}(v_{SoDif})$.

Otherwise, the desired value remains unchanged:

$v_{SoDif}'=v_{SoDif}$.

P-Component

If the above-described low-pass filtering is not carried out in block 111, then it is possible, as mentioned, for this filtering to be accomplished in differential speed controller 113 in accordance with the equation:

$v_{Difl}(t+1)=v_{Difl}(t)+B_{fil}*[v_{Dif}(t)-v_{Difl}(t)]$ where $B_{fil}$ is a filter constant depending on the condition given above. The P component then corresponds to a $PT_1$ component.

The filtered deviation $\Delta_{Dif}$ is then:

$\Delta_{Dif}(t)=v_{Difl}(t)-v_{SoDif}(t)$.

The output of the P component is:

$d_{np}32 K_{dp} * \Delta_{Dif}(t)$.

I-Component

If "lir" is set, that is, if the cascaded VDC controller is set to make an VDC intervention, the controller parameters with the index "1" are used (i=1); otherwise, i=2 applies.

For the calculation of the integrator value $d_{ni}$, a total of four cases is distinguished as a function of the control deviation $\Delta_{Dif}$ and $d_{ni}$. When the condition:

$\Delta_{Dif} * d_{ni} < \epsilon_{dn1}$ is fulfilled, then in the case $|\Delta Dif| > \epsilon_{Dif2}$, the controller parameter cdi1(i) is used:

$d_{ni,j+1}=d_{ni,j}-c_{di1}(i) * \text{sign}(d_{ni,j})$,  1)

Otherwise, $c_{di2}(i)$ is used:

$d_{ni,j+1}=d_{ni,j}-c_{di2}(i) * \text{sign}(d_{ni,j})$.  2)

If:

$\Delta Dif * d_{ni} \geq \epsilon_{dn1}$ and $|\Delta Dif| > \epsilon_{Dif1}$, then the following applies:

$d_{ni,j+1}=d_{ni,j}+c_{di3}(i) * d_{rom}$,  3)

Otherwise, $d_{ni,j+1}=d_{ni,j}-c_{di4}(i) * \text{sign}(d_{ni,j})$.  4)

The dynamics of the integrator are improved, in that the integrator value is readjusted to follow the P component in certain cases:

$d_{ni}=\max(|d_{ni}|, c_{di4}(i)*\Delta_{Dif}*\text{sign}(\Delta_{Dif}))$.

The integrator value, finally, is given upper and lower limits by:

$d_{ni}=\min(|d_{ni}|, d_{nimax}) * \text{sign}(d_{ni})$

Controller Output

The controller output of differential speed controller 113 consists of the sum of the P component and the I component:

$M_{Dif}=d_{np}+d_{ni}$.

The moments $M_{Kar}$ and $M_{Dif}$ are distributed over the actuators in block 114. The differential moment $M_{Dif}$ calculated by differential speed controller 113 can be brought about only by corresponding differences in the braking moment between the left and rear drive wheels. In contrast, the cardan moment $M_{Kar}$ calculated by cardan speed controller 112, which acts on the entire drive train, can be brought about both by a symmetrical brake intervention and by an engine intervention.

Through the distribution of the moment over the actuators, the moments $M_{Kar}$ and $M_{Dif}$ are distributed over the actuators, the differences in their dynamics being taken into account. Blocks 12l, 12r designate the actuators for the brake systems of the left and right wheels, and block 13 designates the unit which controls the engine. In order to realize the moments $M_{Kar}$ and $M_{Dif}$ therefore, interventions are made in the brakes of both the left and right drive wheels and also in the motor control unit (e.g., a throttle valve). The relatively slow-acting throttle valve intervention can be supplemented relatively easily by fast engine interventions such as ignition angle adjustment and fuel injection masking.

Determination of the Desired Engine Torque

The drive train is, braked by the braking moments. For this reason, the reduced desired engine torque $M_{Mot,red}$ is the sum of the cardan moment $M_{Kar}$, the differential moment $M_{Dif}$ (with a factor), and the braking moment offset $M_{B,off}$ of the two drive wheels. The reduced desired engine torque is limited by the sum of the reduced driver's command moment $M_{FV,red}$ and the reduced no-load moment $M_{LL,red}$:

$$M_{Mot,red} = \min[M_{Kar} + C_{Br}*(|M_{Dif}| + 2M_{B,off})], M_{FV,red} + M_{LL,red}$$

When a throttle valve intervention is used, a relatively long period of time is required before the desired engine torque is adjusted. The actual engine torque at the moment can be roughly estimated by filtering the desired engine torque through a $PT_1$ low-pass filter:

$$M_{Mot,t+1}' = M_{Mot,t}' + b_{Motfil}*(M_{Dk,red,t} - M_{Mot,t}) \quad (1)$$

Here $M_{Mot}'$ is the estimated value for the reduced actual engine torque at the moment, and $M_{Dk,red}$ is the reduced desired throttle valve moment, which is calculated by means of the equation:

$$M_{Dk,red} = M_{Mot,red} + c_{Mot}*(M_{Mot,red} - M_{Mot}') \quad (2)$$

The desired throttle valve moment is given a lower limit by the reduced no-load moment:

$$M_{Dk,red} = \max(M_{Dk,red}, M_{LL,red}).$$

Equations (1) and (2) form together a high-pass prefilter for the desired value of the throttle valve position controller. The prefilter improves the guidance transmission behavior of the throttle valve intervention. On the output side, the desired moment for the throttle valve intervention:

$$M_{Dk} = M_{Dk,red} \cdot i_{Ges} - M_{LL}$$

is made available.

Symmetrical Brake Intervention

When the intervention is being made on the throttle valve, the actual engine torque approaches the desired engine torque relatively slowly. For this reason, part of the difference between the desired and the actual engine torque is handled by a faster acting brake intervention. This dynamic moment component $M_{rs,sum}$ is distributed symmetrically over the two drive wheels; the differential moment is therefore not affected.

For the calculation of $M_{rs,sum}$ the following three cases are distinguished:

1) If "lanschlag" is set (engine torque saturation was detected in block 110), then:

$$M_{b,s} = 0.$$

2) If $M_{Mot,red} \geq 0$, then:

$$M_{bs} = C_{Br}*(M_{Mot}' - M_{Mot,red}).$$

3) If $M_{Mot,red} < 0$ then:

$$M_{bs} = |M_{Mot,red}| + C_{Br}*(M_{Mot}' - M_{Mot,red}).$$

$M_{rs,sum}$ is obtained by filtering $M_{bs}$:

$$M_{rs,sum,t+1} = M_{rs,sum,t} + B_{brfil}*(M_{bs,t} - M_{rs,sum,t}).$$

Braking Moment Distribution

The braking moments of the two drive wheels consist of a superimposition of the symmetrical braking moment $M_{rs,sum}$ and the differential moment $M_{Dif}$. The sign of $M_{Dif}$ decides at which wheel the greater braking moment is applied, that is, which wheel is the so-called μ-low wheel.

If $M_{Dif} > 0$, the μ-low wheel is on the left, which means that the left and right braking moments are calculated by means of:

$$M_{b,l} = M_{rs,sum} + M_{B,off} + M_{Dif}$$

and $$M_{b,r} = M_{rs,sum} + M_{B,off}$$

If $M_{b,r} > M_{b,max}$ (braking moment saturation), then:

$$M_{b,r} = M_{b,max}$$

and $$M_{b,l} = M_{b,max} - M_{Dif}.$$

so that the required differential moment between left and right remains preserved. If $M_{Dif} \leq 0$, then, in a corresponding manner:

$$M_{b,r} = M_{rs,sum} + M_{B,off}$$

$$M_{b,l} = M_{rs,sum} + M_{B,off} - M_{Dif}$$

and, where $M_{b,l} > M_{b,max}$, we have:

$$M_{b,r} = M_{b,max} + M_{Dif}$$

$$M_{b,l} = M_{b,max}.$$

Reduction of the Braking Moment Offset

When both desired braking moments exceed the braking moment offset $M_{B,off}$ by only an insignificant amount and the flag "lanschlag" (engine torque saturation has been detected in block 110) is set, the desired braking moments are reduced continuously to decrease the brake load. This means that, when "lanschlag" is set and:

$$\max(M_{b,l}, M_{b,r}) \leq M_{B,off} + \epsilon_{mrs}^0$$

is satisfied, then:

$$M_{b,l} = M_{b,down}$$

$$M_{b,r} = M_{b,down},$$

where $$M_{b,down,t+1} = c_{down} * M_{b,down,t}$$

where $0 < d_{down} < 1$. Otherwise, $M_{b,down}$ is increased again back to the original value $M_{B,off}$:

$$M_{b,down,t+1} = \min(M_{B,off} \cdot c_{up} * M_{b,down,t})$$

where $c_{up} > 1$.

| | LIST OF SYMBOLS USED |
|---|---|
| FDR | vehicle dynamics controller |
| $K_I$ | amplification of the I controller component |
| $K_p$ | amplification of the P controller component |
| lanschlag | flag, set when desired engine torque is in saturation |
| lir | flag, set when FDR intervention is intended |
| $i_{Ges}$ | total transmission ratio between engine and wheels |
| $M_{Kar}$ | desired value for the cardan moment |
| $M_{Dif}$ | desired value for the differential moment |
| $M_{FV}$ | engine torque specified by the driver |
| $M_{RadSo/l}$ | desired braking moment at the left driven wheel of the vehicle |
| $M_{RadSo/r}$ | desired braking moment at the right driven wheel of the vehicle |
| $M_{SoMot}$ | desired value for the engine torque |

LIST OF SYMBOLS USED

| | |
|---|---|
| S1, S2, S3 | threshold values |
| $V_{Radfrei/l}$ | free-rolling (slip-free) rotational speed of the left driven wheel of the vehicle |
| $V_{Radfrei/r}$ | free-rolling (slip-free) rotational speed of the right driven wheel of the vehicle |
| $V_{Rad/l}$ | rotational speed of the left driven wheel |
| $V_{Rad/r}$ | rotational speed of the right driven wheel |
| $V_{SoRad/l}$ | desired value for the rotational speed of the left driven wheel |
| $V_{SoRad/r}$ | desired value for the rotational speed of the right driven wheel |
| $V_{Kar}$ | cardan rotational speed |
| $V_{Dif}$ | differential rotational speed |
| $V_{SoKar}$ | desired value for the cardan rotational speed |
| $V_{SoDif}$ | desired value for the differential rotational speed |
| $V_{Kar/f}$ | filtered cardan rotational speed |
| $V_{Dif/f}$ | filtered differential rotational speed |
| $V_x$ | longitudinal velocity of the vehicle |
| $\lambda_{Rad/l}$ | drive slip at the left driven wheel |
| $\lambda_{Rad/r}$ | drive slip at the right driven wheel |
| $\lambda_{So/l}$ | desired value for the drive slip at the left driven wheel |
| $\lambda_{So/r}$ | desired value for the drive slip at the right driven wheel |
| T, $T_1$, $T_2$ | time constants of the low-pass filter. |

We claim:

1. Method for automatically controlling drive slip in a motor vehicle having an engine, driven wheels, and brakes at said driven wheels, said method comprising determining rotational speeds ($v_{rad/l}$, $v_{rad/r}$) of the driven wheels of the vehicle, determining at least one controlled variable ($v_{kar}$, $v_{dif}$) based on said rotational speeds, determining at least one desired value ($v_{sokar}$, $v_{sodif}$) for each said at least one controlled variable, determining at least one of drive slip ($\lambda_{Rad/l}$, $\lambda_{Rad/r}$) of the driven wheels and longitudinal velocity ($v_x$) of the vehicle based on said rotational speeds, determining that a first operating condition is present when said drive slip is below a first threshold value or when said longitudinal velocity is below a second threshold value, low pass filtering said at least one controlled variable with a first time constant when said first operating condition is present and with a second time constant when said first operating condition is not present, said second time constant being greater than said first time constant, and controlling at least one of said brakes at said driven wheels and said engine in dependence upon said at least one filtered controlled variable and said at least one desired value for said at least one controlled variable.

2. System according to claim 1 wherein the drive slip ($\lambda_{Rad/r}$, $\lambda_{Rad/l}$) of the driven wheels is determined and compared with said first threshold value.

3. System according to claim 1 wherein the longitudinal velocity ($v_x$) of the vehicle is determined and compared with said second threshold value.

4. System according to claim 1 wherein a first controlled variable ($v_{Kar}$) is formed as a function of the average rotational speed of the driven wheels, and in that a second controlled variable ($v_{Dif}$) is formed as a function of the difference between the rotational speeds of the two driven wheels.

5. System according to claim 4 wherein to control the drive slip, the first and the second controlled variables ($v_{Kar}$, $v_{Dif}$) are compared with a first and a second desired value ($v_{SoKar}$, $v_{SoDif}$), where the first and second desired values ($v_{SoKar}$, $v_{SoDif}$) are found as a function of a predetermined desired value for the average absolute slip and a predetermined desired value for a locking moment.

* * * * *

UNITED STATES PATENT AND TRADEMARK OFFICE
CERTIFICATE OF CORRECTION

PATENT NO. : 5,727,856
DATED : March 17, 1998
INVENTOR(S) : Kost et al.

It is certified that error appears in the above-identified patent and that said Letters Patent is hereby corrected as shown below:

In column 7, line 34, at the beginning of the line delete -- ti --.

In column 10, line 46, change "$d_{down}$" to -- $c_{down}$ --.

Signed and Sealed this

Eleventh Day of July, 2000

Attest:

Q. TODD DICKINSON

*Attesting Officer*     *Director of Patents and Trademarks*